United States Patent
Jamjoom et al.

(10) Patent No.: US 10,979,644 B2
(45) Date of Patent: Apr. 13, 2021

(54) 3D SURFACE ESTIMATION AND PREDICTION TO BOOST FIDELITY OF REALTIME LIDAR MODEL GENERATION

(71) Applicant: International Business Machines Corporation, Armonk, NY (US)

(72) Inventors: Hani T. Jamjoom, Cos Cob, CT (US); Justin G. Manweiler, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/268,696

(22) Filed: Feb. 6, 2019

(65) Prior Publication Data

US 2020/0252549 A1     Aug. 6, 2020

(51) Int. Cl.
*H04N 5/232*     (2006.01)
*G06T 17/00*     (2006.01)
*H04N 5/225*     (2006.01)

(52) U.S. Cl.
CPC ......... *H04N 5/23299* (2018.08); *G06T 17/00* (2013.01); *H04N 5/2253* (2013.01); *H04N 5/23238* (2013.01); *G06T 2200/08* (2013.01)

(58) Field of Classification Search
CPC ........... H04N 5/23299; H04N 5/23238; H04N 5/2253; G06T 17/00; G06T 2200/08
See application file for complete search history.

(56) References Cited

U.S. PATENT DOCUMENTS

| | | | |
|---|---|---|---|
| 9,681,065 B2 | 6/2017 | Evans et al. | |
| 2017/0221226 A1 | 8/2017 | Shen et al. | |
| 2018/0067493 A1* | 3/2018 | Pilskalns | G05D 1/0011 |
| 2018/0093171 A1 | 4/2018 | Mallinson | |
| 2018/0099744 A1* | 4/2018 | Bockem | G01S 7/4813 |
| 2018/0158197 A1 | 6/2018 | Dasgupta et al. | |
| 2018/0330198 A1 | 11/2018 | Harary et al. | |
| 2019/0025858 A1 | 1/2019 | Bar-Nahum et al. | |
| 2019/0130639 A1* | 5/2019 | Boyce | G06F 3/013 |

FOREIGN PATENT DOCUMENTS

CN     105323488 A1     2/2016

OTHER PUBLICATIONS

Dramowicz, "Three Standard Geocoding Methods", Oct. 24, 2004, pp. 1-6, https://web.archive.org/web/20070601210655/http://www.directionsmag.com/article.php?article_id=670&trv=1.
University of Edinburgh, "Disk Scheduling", Jun. 15, 1997, pp. 1-3, http://www.dcs.ed.ac.uk/home/stg/pub/D/disk.
International Search Report and Written Opinion dated Jun. 4, 2020 from related PCT/IB2020/050864.

* cited by examiner

*Primary Examiner* — Nam D Pham
(74) *Attorney, Agent, or Firm* — Scully, Scott, Murphy & Presser, PC; Daniel P. Morris, Esq.

(57) ABSTRACT

Systems and methods for capturing images of a target area that include controlling an image sensor mounted to a gimbal to capture images of the target area over time and controlling the gimbal using an elevator algorithm to adjust the orientation of the image sensor.

44 Claims, 7 Drawing Sheets

3D SURFACE ESTIMATION AND PREDICTION TO BOOST FIDELITY OF REALTIME LIDAR MODEL GENERATION

FIELD

The present application relates generally to computers, and computer applications, and more particularly to computer-implemented methods to capture various images of targets.

BACKGROUND

Time-of-flight (ToF) cameras and sensors, such as LiDAR (Light Detection and Ranging, also referred to as three dimensional laser scanning), are now becoming economical and effective for realtime 3D capture. LiDAR can also be used indoors, for example, to track people in a room as well as outdoors to track various moving elements or stable elements.

Using LiDAR in addition to SLAM (Simultaneous Localization and Mapping) can be used to build a detailed 3D mode over time and space, into a single frame of reference.

To date, a single LiDAR sensor cannot capture a space in high fidelity in all dimensions. Typically, a spinning laser or array of laser sensors that tracks 360 degrees of a circle or a portion of 360 degrees of a circle along the axis of rotation is used to capture space in all dimensions. Also, multi-sensor LiDAR can capture several such circles in a column.

What is desired is a sensor or camera coupled to a mechanical gimbal to automatically move the sensor or camera along an additional degree of freedom (DoF), whereby 3D capture of a space can be obtained at a high degree of fidelity.

BRIEF SUMMARY

In one embodiment, a computer implemented method for capturing images of a target area that include controlling an image sensor mounted to a gimbal to capture images of the target area over time and controlling the gimbal using an elevator algorithm to adjust the orientation of the image sensor.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The disclosure is directed to a computer system and a computer-implemented method for capturing images of a target area. One embodiment includes a computer implemented method for image capture of a target area that includes a step of controlling an image sensor mounted to a gimbal to capture images of the target area over time, and also includes a step of controlling the gimbal using an elevator algorithm to adjust the orientation of the image sensor mounted to the gimbal.

Figure 1:
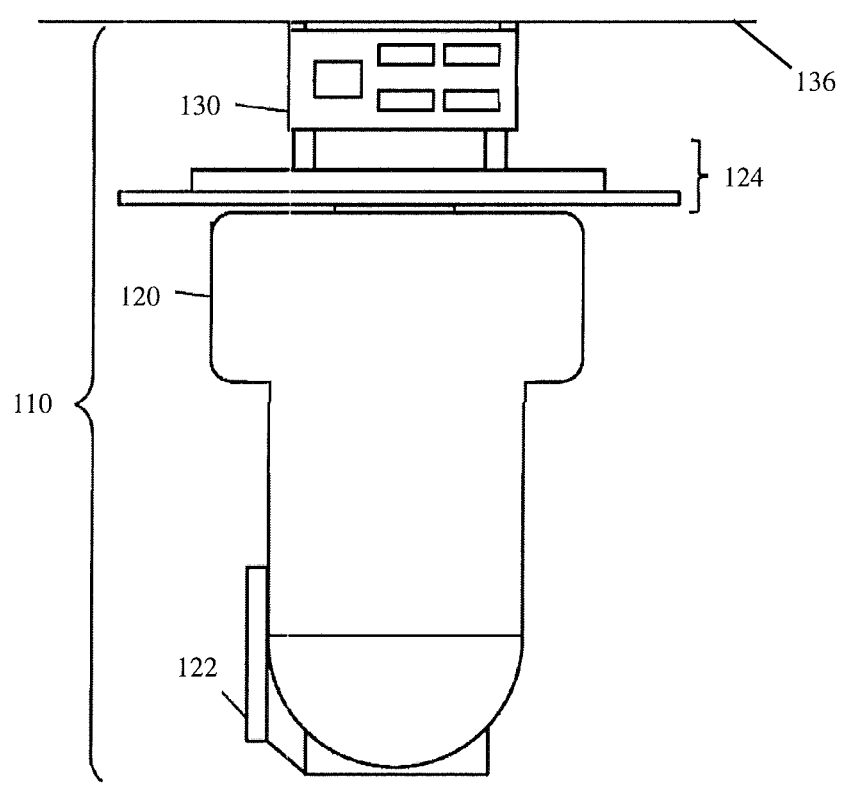
FIG. 1 is a gimbal according to an embodiment of the present disclosure.

FIG. 1 is an illustration of an embodiment of a gimbal assembly 110, which can be attached to any suitable structure through a connection at a base 136.

The gimbal assembly 110 includes a gimbal 120, having an image sensor 122 mounted thereon. As used herein, the term gimbal refers to a number of annular rings and bearings, which are movable and assembled to achieve 3-axis degree of freedom rotation and/or stabilization for image sensors.

In this disclosure the image sensor 122 can be a LiDAR apparatus or any other suitable imaging device that is capable of capturing images of a target area.

The LiDAR apparatus can include a LiDAR light-beam source; at least one transceiver for directing a LiDAR beam from the source to, and collecting the beam reflected from, the target area; a LiDAR detector for time-resolving the reflected beam; and one or more optic devices to route the reflected beam. The LiDAR apparatus is configured to generate a plurality of "shots" (e.g. distance measurements from the LiDAR apparatus to the target area) of laser light.

In combination with the LiDAR apparatus, a controller 130 that operates the LiDAR apparatus can combine the two dimensional distance and location information gathered from the LiDAR apparatus with Simultaneous Localization and Mapping (SLAM) to generate a detailed three dimensional model over time and space, into a single frame of reference. Through the SLAM method, the controller generates a map of an unknown target area (as well as the image sensor's 122 location in reference to the target area) through various suitable algorithms, such as through use of a particle filter, extended Kalman filters and the GraphSLAM method.

The image sensor can also be any suitable imaging device that is able to capture electro-optical (EO) radiation reflected and/or emitted from a target area. The image sensor can be an optical camera capable of detecting various forms of active and/or passive electro-optical radiation, including radiation in the visible wavelengths, infrared radiation, broad-spectrum radiation, X-ray radiation, or any other type of radiation. The imaging device may be implemented as a video camera, such as a high-definition video camera, or other video camera type. In other embodiments, the imaging device may include a still camera, a high-rate digital camera, computer vision camera, or the like.

The gimbal 120 is connected via an interface 124 to the controller 130, which is also part of the gimbal assembly 110. The controller 130 is illustrated as being located between the gimbal 120 and the base 136, but, in other embodiments, the controller 130 can be in any other location that is capable of transmitting a signal to the gimbal 120 and/or the image sensor 122. The interface 124 includes a mechanical and electrical interface for connecting the gimbal 120 and the image sensor 122 to the controller 130 (although controller 130 may be in other suitable locations outside the gimbal assembly 110).

The controller 130 can control the gimbal 120 and/or the image sensor 122. By controlling the gimbal 120, the image sensor 122, which is mounted on the gimbal, is indirectly controlled by controller 130. However, the image sensor 122 may instead, or additionally, be directly controlled by the controller 130, e.g. by being instructed to switch on and off, capture various images, generate and receive laser light, etc.

To control the gimbal 120, the controller 130 can use an elevator algorithm to adjust the orientation of the image sensor 122 (through movement of the gimbal 120) along one or more degrees of freedom so that the image sensor 122 can capture images of a target area. These one or more degrees of freedom are roll, pitch and yaw of the image sensor 122. The use of the elevator algorithm to adjust the orientation of the image sensor 122 allows for a single image sensor 122 to generate a three dimensional model, which differs from typical systems, which require multiple sensors to generate three dimensional models.

Movement of gimbal 120 along a single axis can be analogized to motion of the read arm of a spinning hard disk drive (HDD). A SCAN algorithm (referred to as the elevator algorithm) can schedule a buffer of pending read or write requests to a disk—optimizing motion of the arm between the inner and outer edges of the disk following one-dimensional movement.

As an example, the elevator algorithm will be explained with reference to FIG. 2 in the context of a disk scheduling algorithm for the movement of a read/write head of a HDD. Given the following queue—95, 180, 34, 119, 11, 123, 62, 64 with the read/write head initially at the track 50 and the tail track being at 199, the elevator algorithm approach works in a way an elevator does as illustrated in FIG. 2.

Figure 2:
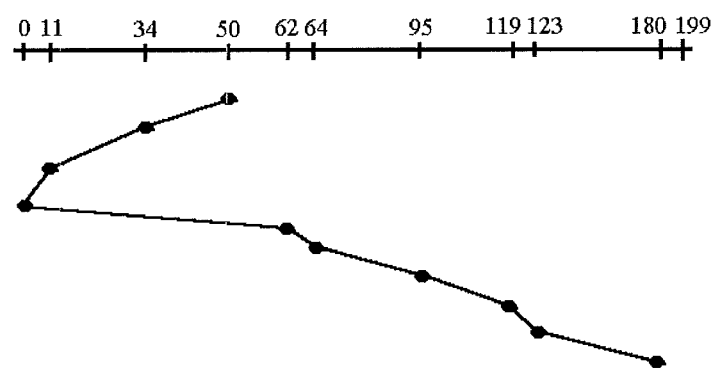
FIG. 2 is a graphical illustration of an example of an elevator algorithm.

As can be seen in FIG. 2, the elevator algorithm causes the read/write head to scan down (from the start point 50) towards the nearest end (with zero being nearer than 199) and then when it hits the lower end of the scale, reverses and begins to scan up towards the upper end of the scale, servicing the requests that weren't previously serviced.

Similarly, points of interest of greatest priority for the disclosed gimbal 120 can be buffered as read/write requests to a memory, which is in communication with controller 130. In the present application, these buffered points of interest are along three dimensional movement. The 3D angular positions must be reduced to a single-dimensional proxy. The elevator algorithm can then be applied to that single-dimensional proxy, instead to sequence the buffer of prioritized points of interest.

To reduce the 3D angular positions to the single-dimensional proxy, several methods may be used. For example, one method would be to use a suitable Z-order curve, which maps multidimensional data to one dimension, while preserving locality of the data points. The Z-value of a point in multidimensions is calculated by interleaving the binary representations of its coordinate values.

One example of a suitable Z-order curve is to apply a geohash algorithm to map the multidimensional data to one dimension. The geohash algorithm can encode a geographic location into a relatively short string of numbers (single dimensional value). The geohash algorithm is a hierarchical spatial data structure, which can be used to transform the values of the Z-order curve, that subdivides spaced into buckets of a grid shape.

As an explanation of the geohash algorithm as it pertains to the present disclosure, the 3D points captured by the image sensor 122, which are represented as angles in degrees of pan and tilt, can be converted to latitude/longitude positions (as if the mounted sensor was the center of a virtual "Earth") by the controller 130. This method treats an arbitrary panning reference point as longitude 0 and an arbitrary tilt reference point as latitude zero.

The single-dimensional decimal output of Geohash on latitude/longitude pairs (derived from pan/tilt) are sufficient as input to the elevator algorithm for 3D angles. Based on this input, the controller 130 can control the gimbal 120's movement to adjust the orientation of the image sensor along three degrees of freedom to build a 3D image model of a target area over a period of time.

Figure 3:
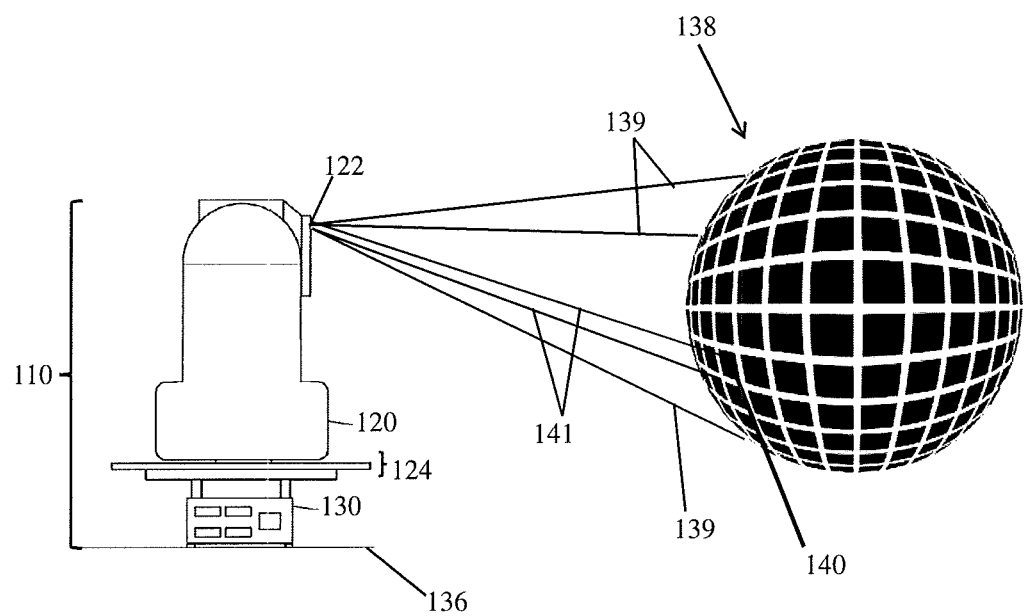
FIG. 3 is a graphical illustration of the gimbal as well as a target area.

The method for capturing images of a target area is further described with reference to FIG. 3. FIG. 3 illustrates a gimbal 120, as well as a target area 138. In this embodiment target area 138 is a 3D, substantially spherical body, but in other embodiments, target area 138 can be any 3D object, including but not limited to landscapes and/or waterscapes (including features above and below water), buildings, structures, interior spaces, exterior spaces, etc. and portions thereof.

As can be seen in FIG. 3, the image sensor 122 has sent captured images 139 along the illustrated lines, thus acquiring images of the target area 138. For each captured image 139, the controller 130 controls the image sensor 122 to gather the captured image 139. In FIG. 3, three captured images 139 are shown, which are gathered over time, however, in other embodiments, two, four or more captured images 139 can be gathered by the image sensor 122 over time.

As more captured images 139 are gathered by the image sensor 122, the controller 130 is controlling the gimbal 120, using the elevator algorithm discussed above, to adjust the orientation of the image sensor 122, thus adjusting the orientation of the captured image 139.

In one embodiment, the controller 130, using the elevator algorithm to adjust the orientation of the gimbal 120, gathers captured images 139 over the entire target area 138. In another embodiment, the controller 130, using the elevator algorithm to adjust the orientation of the gimbal 130, gathers captured images 141 of a sub-area 140 of the target area 138.

This sub-area 140 can be an area of target area 138 that is stationary (such as a house in a landscape), or the sub-area 140 can be an object or an area of target area 138 that is moving (such as an animal in a landscape). When an object or the sub-area 140 is moving, the controller 130 can control the gimbal 120 to continue to obtain images of the object or the sub-area 140, as it moves over time within the target area 138. In one embodiment, the controller 130 can control the gimbal 120 to continue to obtain images of the moving object or moving sub-area 140, even if the object or the sub-area 140 stops for an amount of time.

In some embodiments, the controller 130 can utilize a deep neural network (DNN) for controlling the image sensor 122.

The methodology of the present disclosure may also use the captured images of the target area 138 to train and test a deep neural network. In one embodiment, the DNN may be tested using 10-fold-cross validation. In one embodiment, the output of the network represents number of combined captured images of the target area 138.

Specifically, in the present disclosure, the DNN can be used to increase a fidelity of the 3D image model of the target area 138. To increase the fidelity of the 3D image model of the target area 138 (or any sub-area 140 thereof) the controller 130 can use the DNN to cause the image sensor 122 to capture more images of the target area 138. With the DNN, the controller 130 can increase the fidelity of the 3D image model by continuing to add and/or combine captured images, with further images that are captured by the image sensor 122. The controller 130 can then output a DNN increased fidelity 3D image model.

Along with use of the DNN, the controller 130 can determine a confidence level (interval) of the DNN increased fidelity 3D image model and can control the movement of the gimbal 120 based on the determined confidence level. The controller 130 can determine areas of lower confidence levels of the DNN increased fidelity 3D image model (such as where fewer images were captured by the image sensor 122, thus less combined pixels in the area having a lower confidence level) as well as determining areas of higher confidence levels of the DNN increased fidelity 3D image model (such as where several images were captured by the image sensor 122, thus more combined pixels in the area having a higher confidence level). This determination of confidence is further discussed below.

In order for the controller 130 to use the DNN prior to capturing an image of the target area 138 (or any sub-area 140 thereof), the DNN would previously be trained on an input data set of many 3D models so that the DNN would be trained to predict a dense 3D point cloud or mesh from a sparse sampling. This prediction can be constructed by artificially downsampling a high-resolution point cloud or mesh.

Once trained, the DNN would be used by the controller 130 to predict a dense point cloud or mesh from the images captured by the image sensor 122. Those segments of captured images for which the DNN prediction is returned with high confidence, as determined by the controller 130, are then considered low priority for rescan. Those segments for which the prediction is returned with low confidence, as determined by the controller 130, are then considered high priority for rescan. Once areas of low confidence and high confidence are determined by the controller 130, the controller 130 can movement of the gimbal 120 to adjust the orientation of the image sensor 122 to capture one or more further images of area of low confidence.

Figure 4:
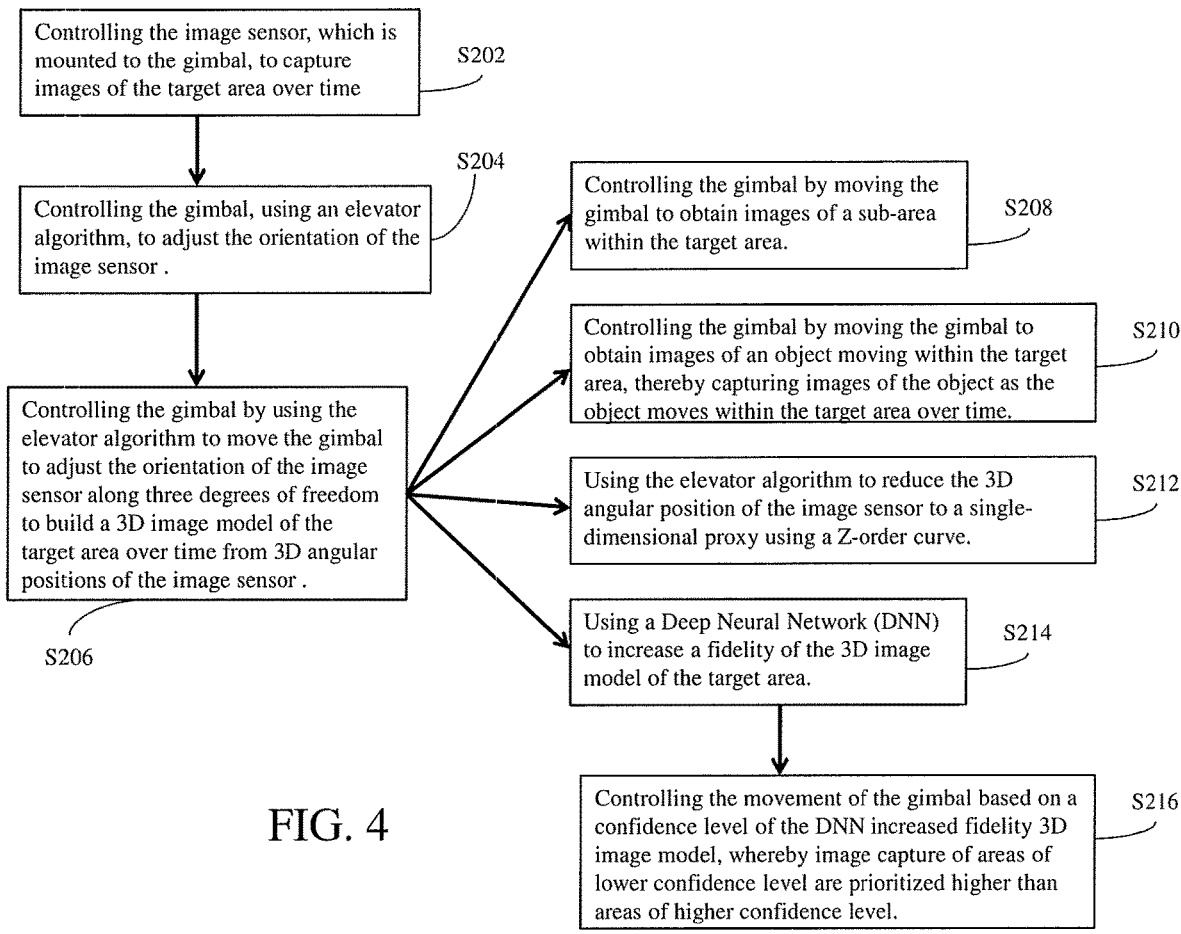
FIG. 4 is a flowchart including several steps of the disclosed method.

To capture images of a target area 138, the controller 130, as shown in FIG. 4, controls the image sensor 122, which is mounted to the gimbal 120 to capture images of the target area 138 over time in step S202. In step S204, the controller 130 controls the gimbal 120, using an elevator algorithm, to adjust the orientation of the image sensor 122.

Next, in step S206, the controller 130 controls the gimbal 120 by using the elevator algorithm to move the gimbal 120 to adjust the orientation of the image sensor 122 along three degrees of freedom to build a 3D image model of the target area 138 over time from 3D angular positions of the image sensor 122.

Next, in step S208 the controller 130 controls the gimbal 120 by moving the gimbal 120 to obtain images of the sub-area 140 within the target area 138.

Alternatively, or in addition to step S208, after step S206 in step S210 the controller 130 controls the gimbal 120 by moving the gimbal 120 to obtain images of an object moving within the target area 138, thereby capturing images of the object as the object moves within the target area 138 over time.

Alternatively, or in addition to step S208 and/or S210, after step S206 in step S212 the controller 130 uses the elevator algorithm to reduce the 3D angular position of the image sensor 122 to a single-dimensional proxy using a Z-order curve.

Alternatively, or in addition to step S208 and/or S210 and/or S212, after step S206 in step S214 the controller 130 uses a Deep Neural Network (DNN) to increase a fidelity of the 3D image model of the target area 138.

After S214, in step S216 the controller 130 controls the movement of the gimbal 120 based on a confidence level of the DNN increased fidelity 3D image model, whereby image capture of areas of lower confidence level are prioritized higher than areas of higher confidence level.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 5:
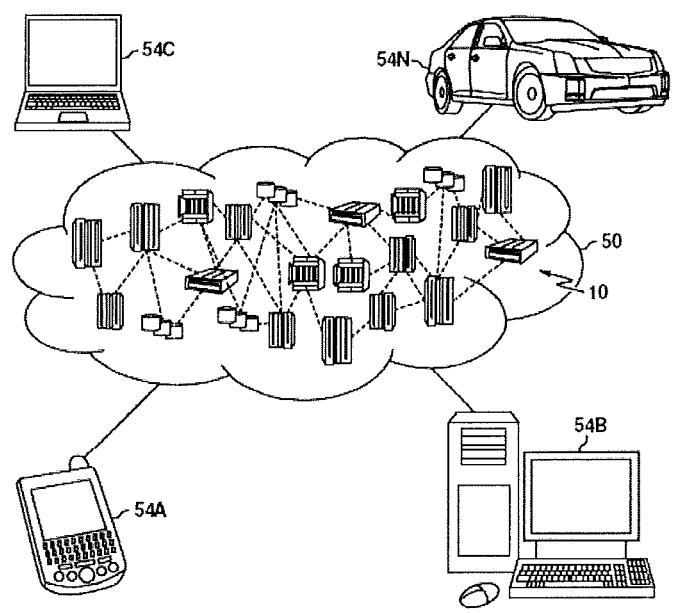
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
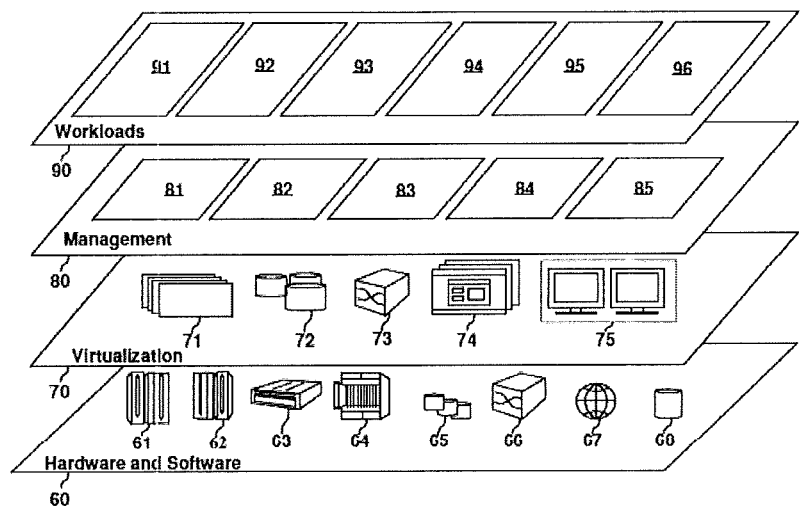
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a personalized recipe 96.

Figure 7:
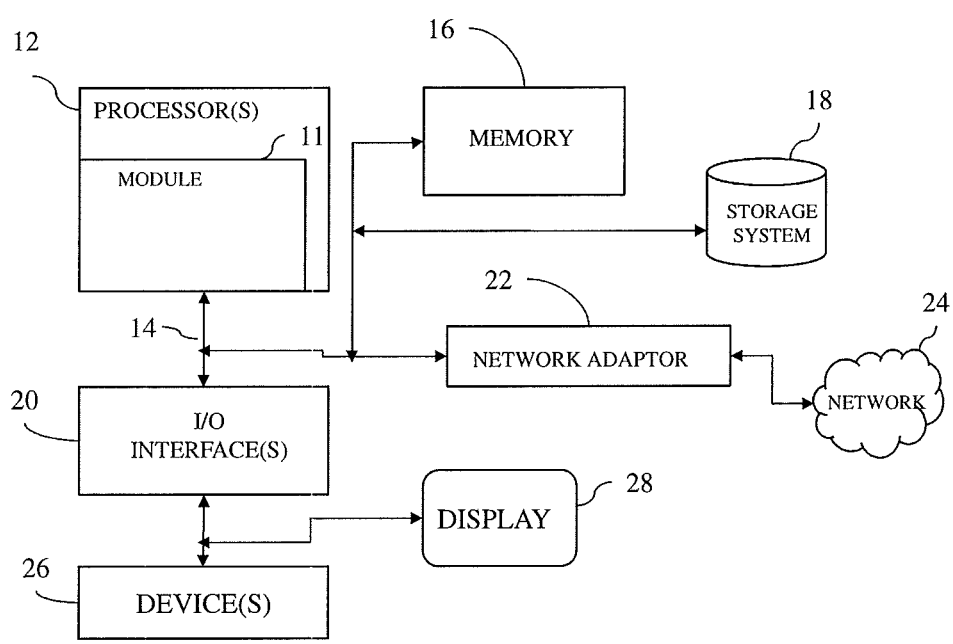
FIG. 7 illustrates a schematic of an example computer or processing system according to an embodiment of the present disclosure.

FIG. 7 illustrates a schematic of an example computer or processing system that may implement the method for generating a personalized recipe in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 11 that performs the methods described herein. The module 11 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for image capture of a target area, comprising:
   controlling a single image sensor mounted to a gimbal to capture images of the target area over time;
   moving the gimbal along a single axis using an elevator algorithm to scan the target area with the single image sensor; and
   controlling the gimbal using the elevator algorithm to adjust the orientation of the single image sensor along at least two degrees of freedom to build a 3D image model of the target area using the single image sensor.

2. The computer implemented method of claim 1, wherein controlling the gimbal comprises using the elevator algorithm to move the gimbal to adjust the orientation of the image sensor along three degrees of freedom to build a 3D image model of the target area over time from 3D angular positions of the image sensor.

3. The computer implemented method of claim 2, wherein controlling the gimbal comprises moving of the gimbal to obtain images of a sub-area within the target area.

4. The computer implemented method of claim 2, wherein controlling the gimbal comprises moving of the gimbal to obtain images of an object moving within the target area thereby capturing images of the object as the object moves within the target area over time.

5. The computer implemented method of claim 2, further including training a Deep Neural Network (DNN) on the captured images to increase a fidelity of the 3D image model of the target area.

6. The computer implemented method of claim 5, further including controlling the movement of the gimbal based on a confidence level of the DNN increased fidelity 3D image model, whereby image capture of areas of lower confidence level are prioritized higher than areas of higher confidence level.

7. The computer implemented method of claim 2, wherein using the elevator algorithm includes reducing the 3D angular positions of the image sensor to a single-dimensional proxy using a Z-order curve.

8. The computer implemented method of claim 1, wherein the method is provided as a service in a cloud environment.

9. A system for image capture of a target area, comprising:
one or more storage devices;
one or more hardware processors coupled to the one or more storage devices;
one or more hardware processors operable to control a single image sensor mounted to a gimbal to capture images of the target area over time;
one or more hardware processors operable to move the gimbal along a single axis using an elevator algorithm to scan the target area with the single image sensor; and
one or more hardware processors operable to control the gimbal using the elevator algorithm to adjust the orientation of the single image sensor along at least two degrees of freedom to build a 3D image model of the target area using the single image sensor.

10. The system of claim 9, wherein the system further comprises one or more hardware processors operable to control the gimbal comprises using the elevator algorithm to move the gimbal to adjust the orientation of the image sensor along three degrees of freedom to build a 3D image model of the target area over time from 3D angular positions of the image sensor.

11. The system of claim 10, wherein the one or more hardware processors are further configured to control the gimbal by moving of the gimbal to obtain images of a sub-area within the target area.

12. The system of claim 10, wherein the one or more hardware processors are further configured to control the gimbal by moving of the gimbal to obtain images of an object moving within the target area thereby capturing images of the object as the object moves within the target area over time.

13. The system of claim 10, wherein the one or more hardware processors are further configured to training a Deep Neural Network (DNN) on the captured images to increase a fidelity of the 3D image model of the target area.

14. The system of claim 13, wherein the one or more hardware processors are further configured to control the movement of the gimbal based on a confidence level of the DNN increased fidelity 3D image model, whereby image capture of areas of lower confidence level are prioritized higher than areas of higher confidence level.

15. The system of claim 10, wherein the one or more hardware processors are further configured to use the elevator algorithm to reduce the 3D angular positions of the image sensor to a single-dimensional proxy using a Z-order curve.

16. A computer readable storage medium storing a program of instructions executable by a machine to perform a method of capturing images of a target area, the method comprising:
controlling a single image sensor mounted to a gimbal to capture images of the target area over time;
moving the gimbal along a single axis using an elevator algorithm to scan the target area with the single image sensor; and
controlling the gimbal using the elevator algorithm to adjust the orientation of the single image sensor along at least two degrees of freedom to build a 3D image model of the target area using the single image sensor.

17. The computer readable storage medium of claim 16, wherein the method further comprises the steps of:
controlling the gimbal comprising using the elevator algorithm to move the gimbal to adjust the orientation of the image sensor along three degrees of freedom to build a 3D image model of the target area over time from 3D angular positions of the image sensor.

18. The computer readable storage medium of claim 17, wherein the method further comprises the steps of:
controlling the gimbal comprising moving of the gimbal to obtain images of a sub-area within the target area.

19. The computer readable storage medium of claim 17, wherein the method further comprises the steps of:
controlling the gimbal comprising moving of the gimbal to obtain images of an object moving within the target area thereby capturing images of the object as the object moves within the target area over time.

20. The computer readable storage medium of claim 17, wherein using the elevator algorithm includes reducing the 3D angular positions of the image sensor to a single-dimensional proxy using a Z-order curve.

21. A computer implemented method for image capture of a target area, comprising:
controlling an image sensor mounted to a gimbal to capture images of the target area over time;
controlling the gimbal using an elevator algorithm to adjust the orientation of the image sensor, including using the elevator algorithm to move the gimbal to adjust the orientation of the image sensor along three degrees of freedom to build a 3D image model of the target area over time from 3D angular positions of the image sensor;
training a Deep Neural Network (DNN) on the captured images to increase a fidelity of the 3D image model of the target area; and
controlling the movement of the gimbal based on a confidence level of the DNN increased fidelity 3D image model, whereby image capture of areas of lower confidence level are prioritized higher for recapture than areas of higher confidence level.

22. The computer implemented method of claim 21, further comprising training the DNN to predict a dense 3D point cloud or mesh.

23. The computer implemented method of claim 22, further comprising constructing the prediction by artificially downsampling a high-resolution point cloud or mesh.

24. A computer implemented method for image capture of a target area, comprising:
controlling an image sensor mounted to a gimbal to capture images of the target area over time; and
controlling the gimbal using an elevator algorithm to adjust the orientation of the image sensor, the controlling including (i) using the elevator algorithm to move the gimbal to adjust the orientation of the image sensor along three degrees of freedom to build a 3D image model of the target area over time from 3D angular positions of the image sensor and (ii) using the elevator algorithm to reduce the 3D angular positions of the image sensor to a single-dimensional proxy.

25. The computer implemented method of claim 24, comprising using a Z-order curve to reduce the 3D angular positions of the image sensor to a single-dimensional proxy.

26. The computer implemented method of claim 25, wherein using the Z-order curve includes applying a geohash algorithm to map multidimensional data to one dimension.

27. The computer implemented method of claim 26, wherein the geohash algorithm is a hierarchical spatial data structure configured to transform values of the Z-order curve that subdivides the target area into a grid shape.

28. The computer implemented method of claim 27, further comprising representing the 3D angular positions of the image sensor as angles in degrees of pan and tilt, converting the 3D angular positions to latitude/longitude positions, wherein an arbitrary panning reference point is longitude 0 and an arbitrary tilt reference point is latitude zero.

29. A system for image capture of a target area, comprising:
one or more storage devices;
one or more hardware processors coupled to the one or more storage devices;
one or more hardware processors operable to control an image sensor mounted to a gimbal to capture images of the target area over time; and
one or more hardware processors operable to:
control the gimbal using an elevator algorithm to adjust the orientation of the image sensor, the control including using the elevator algorithm to move the gimbal to adjust the orientation of the image sensor along three degrees of freedom to build a 3D image model of the target area over time from 3D angular positions of the image sensor;
train a Deep Neural Network (DNN) on the captured images to increase a fidelity of the 3D image model of the target area; and
control the movement of the gimbal based on a confidence level of the DNN increased fidelity 3D image model, whereby image capture of areas of lower confidence level are prioritized higher for recapture than areas of higher confidence level.

30. The system of claim 29, further comprising training the DNN to predict a dense 3D point cloud or mesh.

31. The system of claim 30, further comprising constructing the prediction by artificially downsampling a high-resolution point cloud or mesh.

32. A system for image capture of a target area, comprising:
one or more storage devices;
one or more hardware processors coupled to the one or more storage devices;
one or more hardware processors operable to control an image sensor mounted to a gimbal to capture images of the target area over time; and
one or more hardware processors operable to control the gimbal using an elevator algorithm to adjust the orientation of the image sensor, the control including (i) using the elevator algorithm to move the gimbal to adjust the orientation of the image sensor along three degrees of freedom to build a 3D image model of the target area over time from 3D angular positions of the image sensor and (ii) using the elevator algorithm to reduce the 3D angular positions of the image sensor to a single-dimensional proxy.

33. The system of claim 32, further comprising using a Z-order curve to reduce the 3D angular positions of the image sensor to a single-dimensional proxy.

34. The system of claim 33, wherein using the Z-order curve includes applying a geohash algorithm to map multidimensional data to one dimension.

35. The system of claim 34, wherein the geohash algorithm is a hierarchical spatial data structure configured to transform values of the Z-order curve that subdivides the target area into a grid shape.

36. The system of claim 35, further comprising representing the 3D angular positions of the image sensor as angles in degrees of pan and tilt, converting the 3D angular positions to latitude/longitude positions, wherein an arbitrary panning reference point is longitude 0 and an arbitrary tilt reference point is latitude zero.

37. A computer readable storage medium storing a program of instructions executable by a machine to perform a method of capturing images of a target area, the method comprising:
controlling an image sensor mounted to a gimbal to capture images of the target area over time, the controlling including (i) using an elevator algorithm to adjust the orientation of the image sensor, the controlling including using the elevator algorithm to move the gimbal to adjust the orientation of the image sensor along three degrees of freedom to build a 3D image model of the target area over time from 3D angular positions of the image sensor and (ii) using the elevator algorithm to reduce the 3D angular positions of the image sensor to a single-dimensional proxy.

38. The computer readable storage medium of claim 37, wherein the method further comprises the steps of using a Z-order curve to reduce the 3D angular positions of the image sensor to a single-dimensional proxy.

39. The computer readable storage medium of claim 38, wherein using the Z-order curve includes applying a geohash algorithm to map multidimensional data to one dimension.

40. The readable storage medium of claim 39, wherein the geohash algorithm is a hierarchical spatial data structure configured to transform values of the Z-order curve that subdivides the target area into a grid shape.

41. The computer readable storage medium of claim 40, wherein the method further comprises the steps of representing the 3D angular positions of the image sensor as angles in degrees of pan and tilt, converting the 3D angular positions to latitude/longitude positions, wherein an arbitrary panning reference point is longitude 0 and an arbitrary tilt reference point is latitude zero.

42. A computer readable storage medium storing a program of instructions executable by a machine to perform a method of capturing images of a target area, the method comprising:
controlling an image sensor mounted to a gimbal to capture images of the target area over time; and
controlling the gimbal using an elevator algorithm to adjust the orientation of the image sensor, including controlling the gimbal comprising using the elevator algorithm to move the gimbal to adjust the orientation of the image sensor along three degrees of freedom to build a 3D image model of the target area over time from 3D angular positions of the image sensor;
training a Deep Neural Network (DNN) on the captured images to increase a fidelity of the 3D image model of the target area; and
controlling the movement of the gimbal based on a confidence level of the DNN increased fidelity 3D image model, whereby image capture of areas of lower confidence level are prioritized higher for recapture than areas of higher confidence level.

43. The computer readable storage medium of claim 42, wherein the method further comprises the steps of training the DNN to predict a dense 3D point cloud or mesh.

44. The computer readable storage medium of claim 43, wherein the method further comprises the steps of constructing the prediction by artificially downsampling a high-resolution point cloud or mesh.

* * * * *